United States Patent [19]
Maehara et al.

[11] Patent Number: 5,168,791
[45] Date of Patent: Dec. 8, 1992

[54] LIQUID-OPERATED BOOSTER

[75] Inventors: Katsumi Maehara; Atsuhito Yamaguchi, both of Yokosuka, Japan

[73] Assignee: Nippon Air Brake Co., Ltd., Hyogo, Japan

[21] Appl. No.: 818,175

[22] Filed: Jan. 8, 1992

[30] Foreign Application Priority Data

Mar. 26, 1991 [JP] Japan .................. 3-087813

[51] Int. Cl.$^5$ ............................... F15B 9/10
[52] U.S. Cl. ..................... 91/376 R; 60/547.1; 60/588
[58] Field of Search .............. 91/365.1, 376 R, 370, 91/371, 372; 60/547.1, 581, 548, 585, 588, 589

[56] References Cited

U.S. PATENT DOCUMENTS

| | | | |
|---|---|---|---|
| 3,106,874 | 10/1963 | Schultz | 60/547.1 |
| 3,793,829 | 2/1974 | Swanson | 60/547.1 |
| 3,878,682 | 4/1975 | Takahashi et al. | 60/547.1 |
| 3,937,127 | 2/1976 | Baker et al. | 91/372 |
| 4,514,981 | 5/1985 | Brown et al. | 60/547.1 |
| 4,882,976 | 11/1989 | Abbing et al. | 91/376 R |

*Primary Examiner*—Edward K. Look
*Assistant Examiner*—Hoang Nguyen
*Attorney, Agent, or Firm*—Kane, Dalsimer, Sullivan, Kurucz, Levy, Eisele and Richard

[57] ABSTRACT

There is disclosed a liquid-operated booster having a jump-up function, in which the production of an internal pressure in a reaction force chamber in accordance with a reduction of the volume of the reaction force chamber is prevented. To achieve this, a mechanism for relieving the reduction of the volume of the reaction force chamber due to a relative movement of a piston and an input member toward each other is provided at a position facing the reaction force chamber. Most preferably, this relieving mechanism is constituted by a movable small piston provided at the side of an operating input.

15 Claims, 3 Drawing Sheets

LIQUID-OPERATED BOOSTER

BACKGROUND OF THE INVENTION

This invention relates generally to a liquid-operated booster for use in a brake system of a vehicle or the like so as to boost the operation of a master cylinder, and more particularly to the type of liquid-operated booster having a so-called jump-up function.

A liquid-operated booster of a general type is disclosed in U.S. Pat. No. 4,882,976. There are also known improved liquid-operated boosters, as disclosed in Japanese Laid-Open Patent Application Nos. 2-68258 and 3-143762, in which the pressure of a reaction force chamber is restrained at an initial stage of an inputting operation so as to reduce the initial operating force, thereby enhancing rise characteristics of a boosting force for a master cylinder. In the booster having such a jump-up function, the reaction force chamber is provided separately from a servo chamber, and a valve for achieving the jump-up effect is provided between the two chambers. This valve functions to prevent the introduction of the liquid pressure into the reaction force chamber until the liquid pressure introduced into the servo chamber reaches a predetermined level. The above Japanese Laid-Open Patent Application No. 3-143762 corresponds to U.S. patent application Ser. No. 07/691,645 (filed Apr. 25, 1991) and European Patent Application No. 91303809.7 (filed Apr. 26, 1991).

In the liquid-operated booster of this type, the servo chamber is formed at one end of a piston slidably received in a cylinder bore, and the reaction force chamber is formed between an input member, extending through the servo chamber into a recess of the piston, and the piston. Therefore, there is encountered a problem that when the input member and the piston move closer relative to each other in response to the operation of the brake, the volume of the reaction force chamber is reduced before the liquid pressure is introduced into the reaction force chamber, so that an internal pressure is produced in the reaction force chamber. As a result, the pressure of the reaction force chamber is increased, so that the pressure differential between the reaction force chamber and the servo chamber is small, and therefore a desired jump-up effect can not be obtained.

SUMMARY OF THE INVENTION

It is therefore an object of this invention to provide a liquid-operated booster having a jump-up function, in which the production of an internal pressure in a reaction force chamber in accordance with a reduction of the volume of the reaction force chamber can be effectively prevented.

According to the present invention, there is provided a liquid-operated booster comprising a cylinder body having a cylinder bore formed therein and extending along an axis thereof; a piston slidably received in the cylinder bore; a servo chamber formed by the piston and the cylinder body and provided at one end portion of the cylinder bore, a recess being formed in that portion of the piston close to the servo chamber; a pressure passage communicating the recess with a liquid pressure source; a discharge passage communicating the recess with a liquid pressure-releasing source; an input member extending through the servo chamber and slidably received in the recess; a discharge valve provided in the recess so as to selectively communicate the servo chamber with the discharge passage in response to the movement of the input member; a supply valve for selectively communicating the servo chamber with the pressure passage; a reaction force chamber formed between the piston and the input member so as to enable the input member to receive the liquid pressure, introduced into the servo chamber, against an operating input; and a valve for preventing the liquid pressure from being introduced into the reaction force chamber until the liquid pressure introduced into the servo chamber reaches a predetermined level; wherein mean for relieving a reduction of the volume of the reaction force chamber due to a relative movement of the piston and the input member toward each other is provided at a position facing the reaction force chamber.

Thus, in the present invention, the mean for relieving the reduction of the volume of the reaction force chamber due to the relative movement of the piston and the input member toward each other is provided at the position facing the reaction force chamber. Preferably, the means for relieving the volume reduction is constituted by a small piston (purge piston) movable toward the operating input side. This relieving means may be formed by an elastically deformable member such as a hollow O-ring and a ball.

By the provision of the above relieving means, the volume of the reaction force chamber will not be reduced before the liquid pressure is supplied from the servo chamber into the reaction force chamber, and therefore good jump-up characteristics can be obtained.

DESCRIPTION OF THE PREFERRED EMBODIMENTS

First Embodiment

Figure 1:
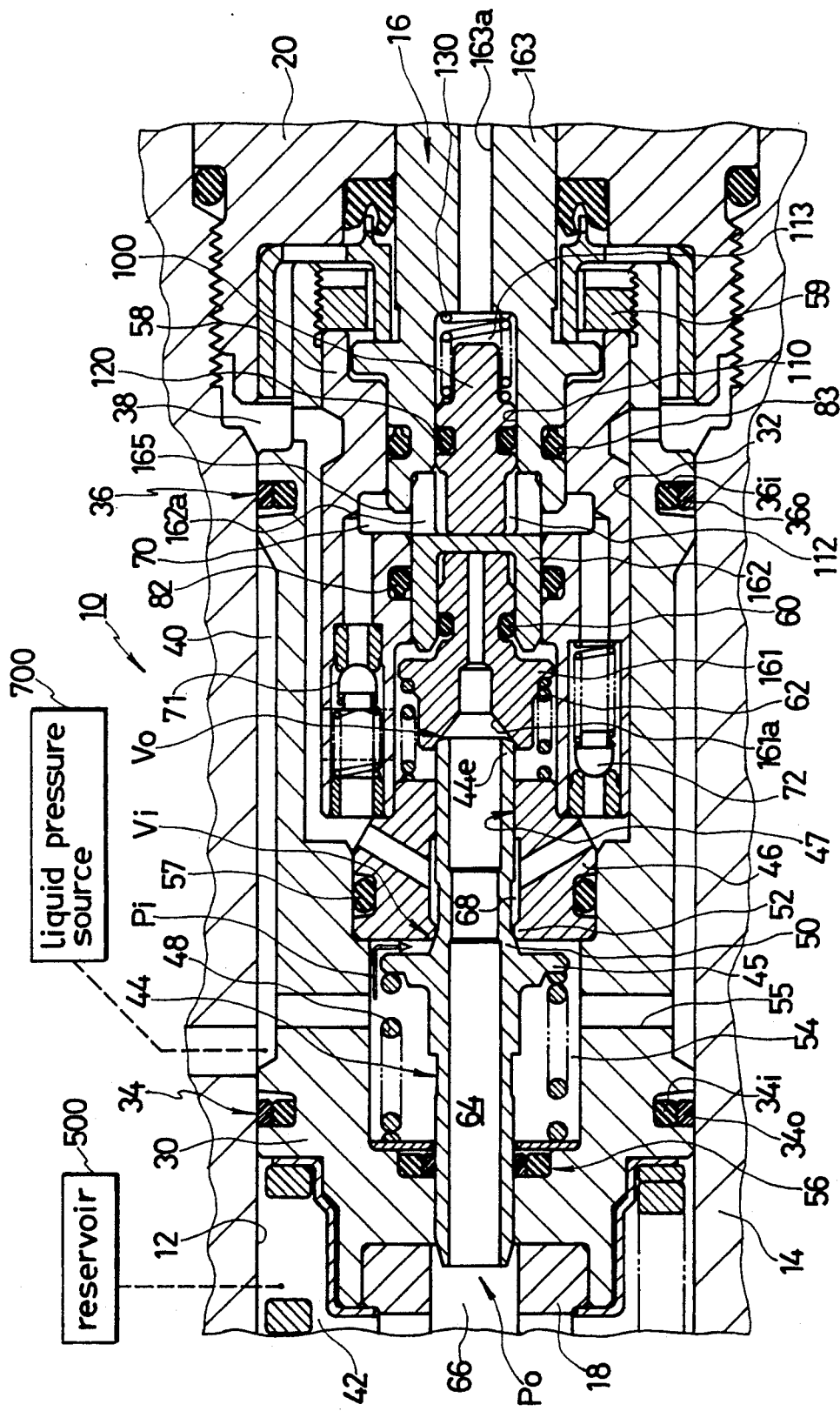
FIG. 1 is a cross-sectional view of a portion of a liquid-operated booster according to a first embodiment of the present invention.

A liquid-operated booster 10 comprises a cylinder body 14 having a stepped cylinder bore 12 therein. In this booster 10, an operating force is applied from one side of the cylinder body 14 to an input member 16 via a pedal and other parts, so that a servo operation is produced in response to the movement of the input member 16. The force boosted by this servo operation is transmitted to an output member 18, disposed at the other side of the cylinder body 14, via a piston 30 received in the cylinder bore 12, and then is applied to a master cylinder.

The piston 30 has a stepped recess 32 which is formed therein and is open toward the input member 16. The recess 32 is the largest in diameter at its open end portion, and is reduced in diameter in a stepped manner toward its inner end. Seal rings 34 and 36 are mounted on the outer periphery of the piston 30, and are spaced from each other along the length of the piston 30. The seal rings 34 and 36 divide the interior of the cylinder bore 12 into a plurality of chambers. More specifically, the chamber, provided adjacent to a plug 20 closing the open end of the cylinder bore 12, is a servo chamber 38, and the chamber disposed between the seal rings 34 and 36 around the piston 30 is an inlet chamber 40, and the chamber around the output member 18 is a low-pressure chamber 42. The low-pressure chamber 42 is communicated with a reservoir 500 (liquid pressure-releasing source) provided at the master cylinder side, and the inlet chamber 40 is communicated with a liquid pressure source 700 including an accumulator and a pump. The seal ring 34 comprises an inner ring 34i of rubber and an outer ring 34o of a resin, and similarly the seal ring 36 comprises an inner ring 36i of rubber and an outer ring 36o of a resin. The outer rings 34o and 36o are provided so as to reduce a sliding resistance of the piston 30. In order to effectively reduce this sliding resistance, it is important to stably support the outer rings 34o and 36o. Therefore, preferably, each of the inner rings 34i and 36i of rubber has a rectangular cross-section, and has a width generally equal to or slightly larger than the width of the outer ring 34o, 36o.

A movable valve member 44 which is elongate and tubular is received in the inner end portion of the recess 32 of the piston 30. The movable valve member 44 is supported by the end of the piston 30 and a seat member 46, and is movable along the axis of the piston 30. A flange 45 is formed on the outer periphery of the movable valve member 44 intermediate the opposite ends thereof. The movable valve member 44 is urged toward the input member 16 by a spring 48 acting on the flange 45. In this condition, a bulged portion 50 of the movable valve member 44 provided adjacent to the flange 45 is held in contact with an open portion 52 of a central valve hole 47 in the seat member 46. The bulged portion 50 and the open portion 52 cooperate with each other to form a supply valve Vi. The supply valve Vi serves to supply the liquid pressure from the external liquid pressure source 700 to the servo chamber 38 via a pressure passage Pi and the recess 32.

A valve chamber 54 in which the spring 48 is received is partitioned off by a seal ring 56 (which is sealingly mounted around one end portion of the movable valve member 44 close to the output member 18) and a seal ring 57 sealingly mounted around the seat member 46. The valve chamber 54 is always communicated with the inlet chamber 40 via a plurality of passages 55 formed radially in the piston 30. The seal ring 56 around the movable valve member 44 is similar in construction to the seal rings 34 and 36 around the piston 30, though inner and outer rings of the seal ring 56 is arranged in a reversed manner.

The seat member 46 is integrally connected to the piston 30 by a tubular member 58, inserted into the recess 32 of the piston 30, and a threaded ring 59 threadedly connected to the open end portion of the recess 32. The central valve hole 47 of the seat member 46 extends through the seat member 46, and one end 44e of the movable valve member 44 close to the input member 16 is projected from the valve hole 47. The input member 16 is axially divided into three members 161, 162 and 163. The projected end 44e faces the first member 161 constituting one end portion of the input member 16. The first member 161 is fitted in a hole in one end portion of the second member 162, with a seal ring 60 interposed therebetween. The first member 161 is urged toward the second member 162 by a spring 62. A recess 161a of a generally conical shape is formed in one end of the first member 161 remote from the second member 162, and the end 44e of the movable valve member 44 faces the recess 161a so as to be brought into and out of sealing engagement with the surface of the recess 161a. The recess 161a provides a discharge valve seat, and cooperates with the end 44e of the movable valve member 44 to form a discharge valve Vo. The discharge valve Vo controls the communication between the servo chamber 38 and the low-pressure chamber 42 and the interruption of this communication. A passage 64, formed axially through the movable valve member 44, and a passage 66 formed in the end portion of the output member 18 serve as a discharge passage Po.

In the liquid-operated booster 10 of the above construction, a reaction force chamber 70 is provided within the tubular member 58, and is formed between the tubular member 58 and the input member 16. Since it is necessary to provide a pressure acting against the operating input from the input member 16, a step portion 165 is necessarily formed at that portion of the input member 16 related to the reaction force chamber 70. The step portion 165 is disposed between the third member 163 (on which a seal ring 83 is mounted) and the second member 162 sealed by a seal ring 82. As the input member 16 is moved left (FIG. 1) at the time of operating a brake, the amount of intruding of the step portion 165 into the reaction force chamber 70 is increased. As a result, the volume of the reaction force chamber 70 is reduced, so that the pressure within the reaction force chamber 70 begins to increase. Therefore, in this embodiment, for relieving the reduction of the volume of the reaction force chamber 70, there is provided a small piston (purge piston) 100 movable toward the operating input side. The small piston 100 is received within a hole 110 defined by the second member 162 and the third member 163. The second and third members 162 and 163 are integrally connected together by press-fitting or the like. An O-ring 120 is mounted on the central portion of the small piston 100 to divide the hole 110 into two portions, that is, left and right chambers 112 and 113. The left chamber 112 is communicated with the reaction force chamber 70 via notched passages 162a, and the right chamber 113 is open to the atmosphere via a central passage 163a formed axially through the third member 163. The small piston 100 is urged by a spring 130, provided in the right chamber 113, so that in the inoperative condition of the brake, the left end of the small piston 100 is abutted against the second member 162, as shown in FIG. 1.

In connection with the reaction force chamber 70, two check valves are provided in the tubular member 58. One of them is a balance valve 71 which allows the flow of the liquid pressure from the reaction force chamber 70 toward a relay chamber 68, and the other is a jump-up valve 72 which allows the flow of the liquid pressure in the opposite direction. The jump-up valve 72 functions to prevent the liquid pressure from being introduced into the reaction force chamber 70 until the liquid pressure reaches a predetermined level. The balance valve 71 functions to release the liquid pressure from the reaction force chamber 70 when the pressure differential between the servo chamber 38 and the reaction force chamber 70 reaches the valve opening pressure of the valve 71 during the time when the liquid pressure in the servo chamber 38 is returned to the reservoir side. In connection with the two valves 71 and 72, the diameter of the small piston 100 and the operating forces of the springs are so determined as to satisfy the following conditions (1) and (2):

$$Pj > Pp \geq Pb \qquad (1)$$

where Pj represents the valve opening pressure of the jump-up valve 72, Pp represents the liquid pressure starting the movement of the small piston 100, and Pb represents the valve opening pressure of the balance valve 71.

$$Sp \geq So \qquad (2)$$

where Sp represents the volume change in response to the movement of the small piston 100 in the right direction, and So represents the volume change in response to the movement of the step portion 165 of the input member 16 in the left direction.

In the liquid-operated booster 10 of the first embodiment, when the pressure of the reaction force chamber 70 increases in response to the operation of the brake, this increased pressure acts on the left side of the small piston 100 to move the small piston 100 right against the bias of the spring 130. Therefore, the volume of the reaction force chamber 70 is increased, and as a result the reduction of the volume of the reaction force chamber 70 in response to the leftward movement of the input member 16 is effectively relieved. Incidentally, by preventing the internal pressure from developing in the reaction force chamber 70, there is achieved an additional effect that a force for pressing down the pedal in a non-servo condition before the introduction of the liquid pressure into the servo chamber 38 is reduced.

Second Embodiment

Figure 2:
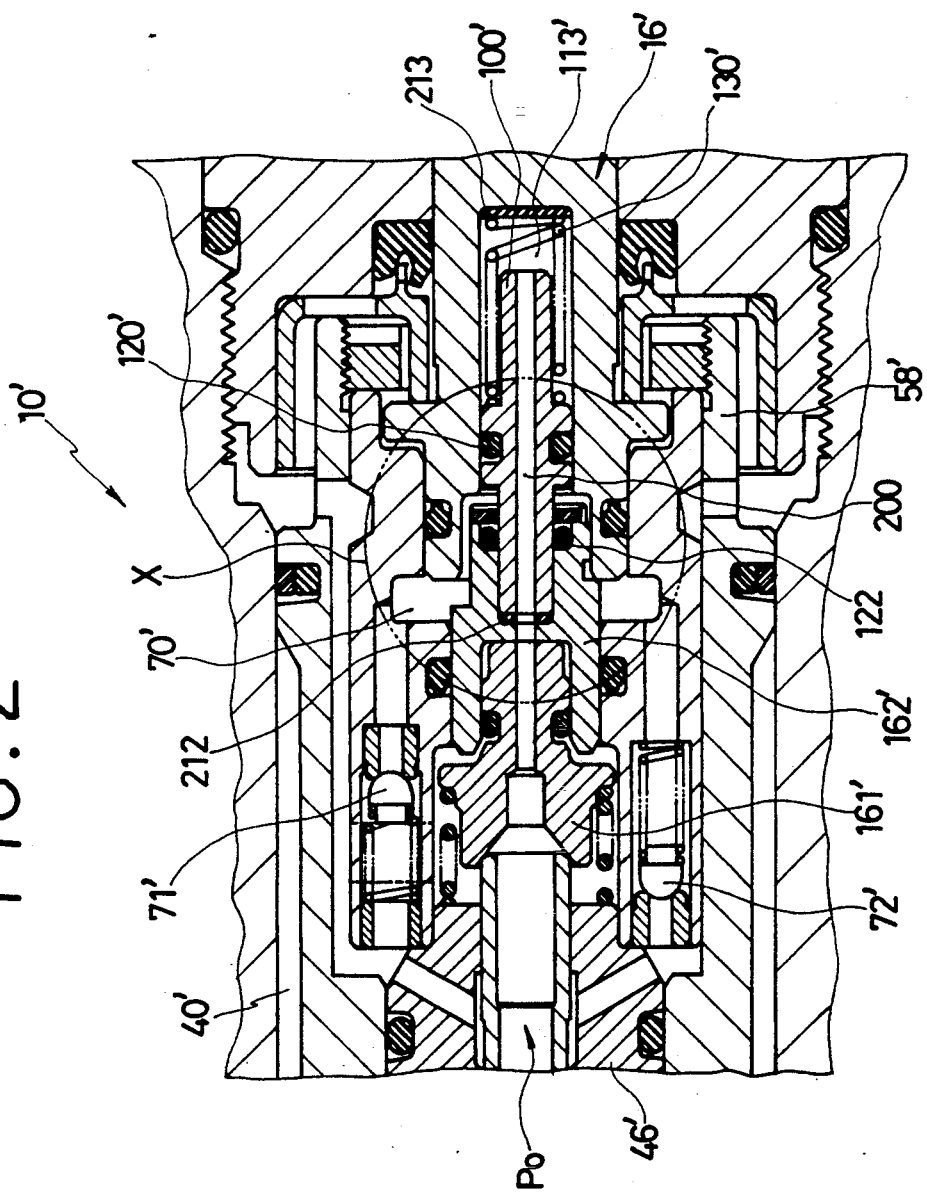
FIG. 2 is a cross-sectional view of an important portion of a liquid-operated booster according to a second embodiment of the invention.

In a liquid-operated booster 10' of the second embodiment of the invention shown in FIG. 2, the reduction of the volume of a reaction force chamber 70' is relieved by a small piston 100' similar to the small piston 100 of the first embodiment. Those portions of the second embodiment corresponding respectively to those of the first embodiment are designated respectively by identical reference numerals with a dash ('), and explanation thereof will be omitted, and only different portions will be mainly described.

In the liquid-operated booster 10', damage to an O-ring 120' around the small piston 100' is taken into consideration, and there is provided means by which even if the leaked liquid due to the damage to this O-ring intrudes into a right chamber 113', this leaked liquid will not leak to the exterior of the booster. More specifically, in the liquid-operated booster 10', the right chamber 113' is defined by a closed space, and the leaked liquid is returned from this space to a reservoir via a central through hole 200 (which is formed axially through the small piston 100') and a discharge passage Po. The pressure receiving area of the small piston 100' at the side of the reaction force chamber 70' is the difference between the sealing area of the O-ring 120' and the sealing area of an O-ring 122 provided between a second member 162' and the small piston 100'. Cushioning members 212 and 213 made of rubber, a plastics material or the like are provided at the positions respectively opposed to the left and right ends of the small piston 100', thereby preventing the generation of impact sounds.

Third Embodiment

Figure 3:
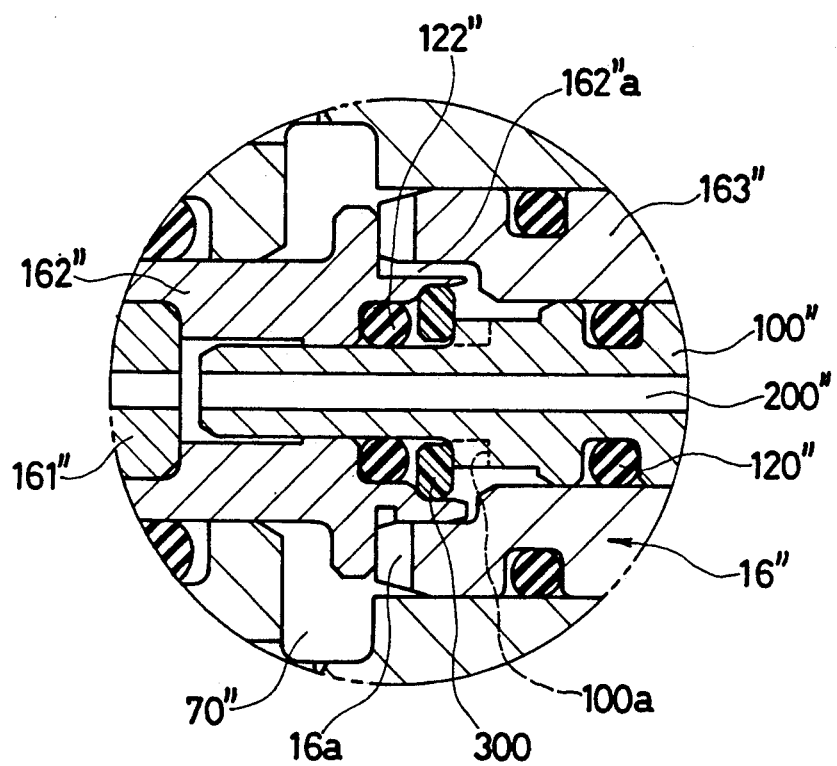
FIG. 3 is a cross-sectional view of a portion of a liquid-operated booster of a third embodiment of the invention corresponding to that portion of FIG. 2 encircled by X.

A liquid-operated booster 10" of a third embodiment of the invention shown in FIG. 3 is a modification of the liquid-operated booster of the second embodiment. Therefore, modified portions, that is, those portions different from those of the second embodiment, will be described. Those portions of the third embodiment corresponding respectively to those of the second embodiment are designated respectively by identical reference numerals with a double dash ("), and detailed explanation thereof will be omitted.

In the third embodiment, a member serving as a stopper for a small piston 100" is different from that of the second embodiment. In the second embodiment, a step portion in the hole of the second member 162' serves as a stopper via the cushioning member 212, whereas in the third embodiment, the small piston 100" itself is stepped at its outer periphery, and a retainer member 300 for an O-ring 122" (which is disposed between a second member 162" and the small piston 100") serves as the stopper for the small piston 100". Further, in the third embodiment, in order to sufficiently communicate a reaction force chamber 70" with a space around the small piston 100", notched passages 16a are formed in one end of a third member 163" of an input member 16" close to the second member 162", and also radial ribs 100a are formed on the step portion (indicated by L-shaped broken lines) of the small piston 100" which is abutted against the retainer member 300. In this third embodiment, also, notched passages 162"a are, of course, formed in that portion of the outer periphery of the second member 162" connected to the third member 163".

In the above illustrated embodiments, although the small piston is moved in response to the liquid pressure in the reaction force chamber, the small piston may be moved by mechanical means such as a cam provided between the third member of the input member and the small piston.

What is claimed is:

1. In a liquid-operated booster comprising a cylinder body having a cylinder bore formed therein and extending along an axis thereof; a piston slidably received in said cylinder bore; a servo chamber formed by said piston and said cylinder body and provided at one end portion of said cylinder bore, a recess being formed in that portion of said piston close to said servo chamber; a pressure passage communicating said recess with a liquid pressure source; a discharge passage communicating said recess with a liquid pressure-releasing source; an input member extending through said servo chamber and slidably received in said recess; a discharge valve provided in said recess so as to selectively communicate said servo chamber with said discharge passage in response to the movement of said input member; a supply valve for selectively communicating said servo chamber with said pressure passage; a reaction force chamber formed between said piston and said input member so as to enable said input member to receive liquid pressure from the liquid pressure source, introduced into said servo chamber, against an operating input; and a valve for preventing the liquid pressure from being introduced into said reaction force chamber until the liquid pressure introduced into said servo chamber reaches a predetermined level;

the improvement wherein means for relieving a reduction of volume of said reaction force chamber due to a relative movement of said piston and said input member toward each other is provided at a position facing said reaction force chamber.

2. A liquid-operated booster according to claim 1, in which said means for relieving the reduction of the volume is constituted by a small piston received within said input member, said small piston being movable in a hole formed axially in said input member, a seal ring being mounted on an outer periphery of said small piston to divide said hole of said input member into first and second chambers, means for communicating said first chamber with said reaction force chamber, and a spring being received in said second chamber to urge said small piston toward said first chamber of said hole.

3. A liquid-operated booster according to claim 2, in which said input member comprises a first member, a second member and a third member arranged in this order along an axis of said input member, said hole of said input member being formed in said second member and said third member, and said third member being connected at one end thereof to said second member, and receiving an operating force.

4. A liquid-operated booster according to claim 2, in which the force of said spring for determining a timing at which said small piston begins to move toward said second chamber is smaller than a valve opening pressure of said valve.

5. A liquid-operated booster according to claim 3, in which a step portion in that portion of said hole in said second member serves as a stopper for said small piston.

6. A liquid-operated booster according to claim 5, in which a cushioning member is provided in a step portion in that portion of said hole in said second member.

7. A liquid-operated booster according to claim 3, in which said small piston has a step portion intermediate the opposite ends thereof, said small piston being held in position by abutting said step portion against said second member.

8. A liquid-operated booster according to claim 2, in which means are provided for opening said second chamber to the atmosphere or said liquid pressure-releasing source.

9. A liquid-operated booster according to claim 1, in which a seat member serving as a valve seat for said supply valve is fixedly mounted within said recess of said piston, there being provided a movable valve member which is supported by said valve seat member and said piston so as to move along the axis of said piston body, said movable valve member having at its intermediate portion a bulged portion for said supply valve, one end of said movable valve member facing one end of said input member, and these ends cooperating with each other to form said discharge valve.

10. A liquid-operated booster according to claim 9, in which said seat member is integrally connected to said piston by a tubular member, inserted into said recess, and a ring member fixedly secured to an open end portion of said recess.

11. A liquid-operated booster according to claim 10, in which said tubular member and a plug member closing an open end of said cylinder bore movably support said input member.

12. A liquid-operated booster according to claim 11, in which said reaction force chamber is provided in said tubular member, and is formed by the cooperation of said input member with said tubular member.

13. A liquid-operated booster according to claim 12, in which said input member has a step portion cooperating to form said reaction force chamber.

14. A liquid-operated booster according to claim 12 or claim 13, in which said reaction force chamber is formed at outer peripheral portions of said second and third members of said input member.

15. A liquid-operated booster according to claim 1, in which said valve is provided in said tubular member.

* * * * *